United States Patent [19]
Schuelke et al.

[11] Patent Number: 6,005,733
[45] Date of Patent: Dec. 21, 1999

[54] PREAMPLIFIER BIAS CIRCUIT FOR USE IN AN AC COUPLED MAGNETORESISTIVE READ HEAD AMPLIFIER

[75] Inventors: Robert J. Schuelke, Lakeville; Crispin K. Metzler, Hastings, both of Minn.

[73] Assignee: VTC, Inc., Bloomington, Minn.

[21] Appl. No.: 08/873,762

[22] Filed: Jun. 12, 1997

[51] Int. Cl.$^6$ ..................................................... G11B 5/02
[52] U.S. Cl. ........................... 360/67; 360/66; 360/46; 360/61
[58] Field of Search ...................... 360/67, 66, 46, 360/68, 61, 62; 369/72

[56] References Cited

U.S. PATENT DOCUMENTS

| | | |
|---|---|---|
| 4,743,861 | 5/1988 | Jove et al. . |
| 4,918,406 | 4/1990 | Baumbach et al. . |
| 4,926,271 | 5/1990 | Aoki et al. . |
| 4,937,802 | 6/1990 | Omori et al. . |
| 5,103,353 | 4/1992 | Jove et al. . |
| 5,122,915 | 6/1992 | Klein et al. . |
| 5,270,882 | 12/1993 | Jove et al. . |
| 5,329,408 | 7/1994 | Fuji . |
| 5,357,379 | 10/1994 | Gower . |
| 5,359,466 | 10/1994 | Fuji et al. . |
| 5,377,055 | 12/1994 | Ishii . |
| 5,477,509 | 12/1995 | Shibuya et al. . |
| 5,534,818 | 7/1996 | Peterson . |
| 5,559,646 | 9/1996 | Voorman et al. . |
| 5,619,386 | 4/1997 | Voorman et al. . |

FOREIGN PATENT DOCUMENTS

| | | |
|---|---|---|
| 0 595 350 A2 | 5/1994 | European Pat. Off. . |
| 0 595 350 A3 | 5/1994 | European Pat. Off. . |
| WO 95/10050 | 4/1995 | WIPO . |

*Primary Examiner*—Alan Faber
*Attorney, Agent, or Firm*—Kinney & Lange, P.A.

[57] ABSTRACT

A preamplifier bias circuit for use in an AC coupled magnetoresistive read head amplifier which includes a pair of head contacts, a pair of amplifier inputs, a pair of coupling capacitors and a means for selectively shunting the amplifier inputs and rapidly charge the coupling capacitors. The pair of head contacts and the pair of amplifier inputs couple the preamplifier bias circuit to a magnetoresistive element and a read amplifier, respectively. Each of the coupling capacitors is connected between one of the head contacts and one of the amplifier inputs to block a static potential across the magnetoresistive element. The means for selectively shunting the amplifier inputs selectively provides a low impedance path to rapidly charge the coupling capacitors and clamps the amplifier inputs to a known potential. By selectively providing a low impedance path, the AC coupled magnetoresistive read head amplifier can be protected and its associated delay time prior to operation can be decreased.

39 Claims, 3 Drawing Sheets

PREAMPLIFIER BIAS CIRCUIT FOR USE IN AN AC COUPLED MAGNETORESISTIVE READ HEAD AMPLIFIER

BACKGROUND OF THE INVENTION

The invention pertains to protecting and reducing the recovery time of an AC coupled magnetoresistive read head amplifier for a disc drive. More particularly, it pertains to a preamplifier bias circuit.

In magnetic disc storage systems, it is common to employ MR elements to transduce data recorded on the disc surface to electrical signals for amplification and processing by the data processing apparatus. The MR element is mounted to an actuator arm to be selectively positioned adjacent various concentric tracks on the disc surface. Usually, a separate MR element is employed for each disc recording surface so that where both sides of a disc are recording surfaces, two MR elements are employed. It is also common to stack plural discs for common rotation about a single spindle axis. Thus, a stack of six discs might employ as many as twelve recording surfaces and twelve MR elements.

Ordinarily, data are read from a single disc surface at any given time. Consequently, it is desirable that the bias current to the MR elements be selectively applied only to that element currently active. Data on the recording surface are transduced by the MR element which changes its impedance in accordance with changes in magnetic flux from data recorded on the surface. This change in impedance alters the voltage across the MR element caused by the bias current, and the changing voltage then is applied to an amplifier for processing.

It will be appreciated that the signal applied to the amplifier is an alternating current (AC) signal. However, due to the constant MR head bias current and finite resistance of the MR element, the signal also contains a direct current (DC) offset which adversely affects the recovery of data. For this reason, it is common to employ coupling capacitors to block the DC signal from the MR element so that only the AC signal is applied to the amplifier. Ordinarily, these coupling capacitors are quite large with a separate set of coupling capacitors employed for each of the read channels. Additionally, a separate read amplifier or a portion of the read amplifier is also employed for each read channel.

In order for the coupling capacitors to be effective in blocking the DC signal from the MR element, the charge on the coupling capacitors must be equilibrated with the MR element's DC potential. This equilibration process generally occurs when the bias current is first applied to an MR element but can also occur when transient signals propagate through the system such as when a thermal asperity occurs or when a write-to-read transition occurs. The length of time required to equilibrate the coupling capacitors represents a time delay to the magnetoresistive read head amplifier becoming operational and is equal to the settling time constant of the coupling capacitors. The equilibration time period is therefore equal to the product of the coupling capacitor and the impedance of the read amplifier and its bias circuitry. Thus, in order to decrease the time delay associated with the magnetoresistive read head amplifier becoming operational, the setting time constant of the coupling capacitors must be minimized.

A further concern in utilizing MR elements with read amplifiers in disc drive designs is that transient signals can flow across and damage MR elements when they are not selected for operation. Preferably, the unselected MR elements are held at a known potential which is equal to the potential of the disk. Otherwise, if a large potential difference is created between the disk and the MR element, then a spark can be generated therebetween causing damage to both the disk media and the head element. Thus, a need exists to protect and decrease the time delay of an AC coupled magnetoresistive read head amplifier for a disc drive.

SUMMARY OF THE INVENTION

The invention is a device and method to protect and decrease the delay time of an AC coupled magnetoresistive read head amplifier for a disc drive. The invention comprises a pair of head contacts, a pair of amplifier inputs, a pair of coupling capacitors, and a means for selectively shunting the amplifier inputs to rapidly charge the coupling capacitors and to protect the magnetoresistive read head amplifier.

The pair of head contacts and the pair of amplifier inputs couple the preamplifier bias circuit to a magnetoresistive element and a read amplifier respectively. The pair of coupling capacitors are connected between the pair of head contacts and the pair of amplifier inputs such that the charge on the coupling capacitors equilibrates with a static potential across the magnetoresistive element during its operation. This enables the read amplifier to function properly by blocking the static potential across the magnetoresistive element.

In order to decrease the time associated with equilibrating the coupling capacitors, the means for selectively shunting the amplifier inputs is activated. This provides a low impedance charging path to the coupling capacitors which rapidly charges the coupling capacitors to their equilibration potential. The low impedance charging path also clamps the potential across the amplifier inputs to protect the read amplifier and magnetoresistive element from transient signals or noise.

Thus, by use of the invention, an AC coupled magnetoresistive read head amplifier can be protected and its associated delay time before operation is decreased.

DETAILED DESCRIPTION OF THE PREFERRED EMBODIMENTS

Figure 1:
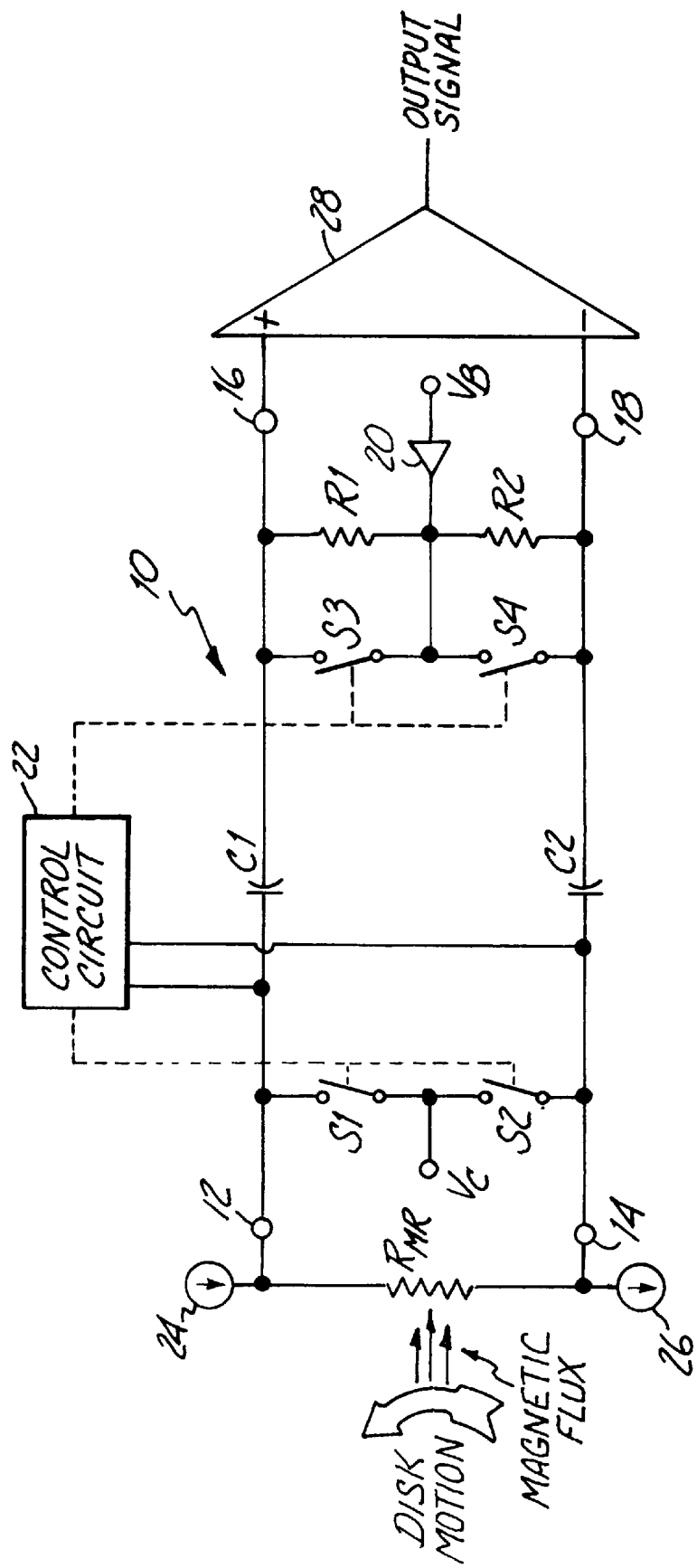
FIG. 1 is a schematic diagram of a preamplifier bias circuit in a first preferred embodiment.

In FIG. 1, a preamplifier bias circuit 10 to protect and decrease the time delay of an AC coupled magnetoresistive read head amplifier for a disc drive is shown in a preferred embodiment. The preamplifier bias circuit 10 comprises a pair of head contacts 12, 14, a pair of shorting switches S1 and S2, a pair of coupling capacitors C1, C2, a pair of shunting switches S3 and S4, a pair of bias resistors R1 and R2, a pair of amplifier inputs 16, 18, a pair of voltage nodes $V_B$ and $V_C$, a buffer 20 and a control circuit 22.

The pair of head contacts 12, 14 connect the preamplifier bias circuit 10 to a magnetoresistive element $R_{MR}$. A potential is created across $R_{MR}$ by current flow from a DC bias current source 24 and a DC bias current sink 26. The resistance of $R_{MR}$ changes in relation to the magnetic flux contained on a disc. When current flows through $R_{MR}$, the change in resistance creates a change in potential across $R_{MR}$. The changes in potential across $R_{MR}$ are propagated through the preamplifier bias circuit 10 and provided to a read amplifier 28 by the pair of amplifier inputs 16, 18. The read amplifier 28 receives the changes in potential across $R_{MR}$ and converts them into an output signal that can then be detected to retrieve the information that is contained on the disc.

However, in addition to the changing resistance component of $R_{MR}$, a static resistance component exists as well. The static resistance creates a static or DC portion to the potential across $R_{MR}$ when current flows through it. If the DC portion of the potential across $R_{MR}$ is propagated through the preamppplifier bias circuit 10 and provided to the read amplifier 28, the ability of the read amplifier 28 to sense the changing or AC portion of the potential representing the information on the disc will be frustrated.

In order to block or prevent the DC portion of the potential from being propagated to the amplifier 28, the coupling capacitor C1 is connected between the head contact 12 and the amplifier input 16 and the coupling capacitor C2 is connected between the head contact 14 and the amplifier input 18. By using the pair of coupling capacitors C1 and C2, once they are coupled or equilibrated to the DC portion of the potential across $R_{MR}$, they will effectively block the DC portion of the potential from being propagated by the preamplifier bias circuit 10. Thus allowing the read amplifier 28 to operate properly.

To properly bias the amplifier 28 in a preferred embodiment, the voltage node $V_B$ is connected through the buffer 20 between the pair of bias resistors R1 and R2, which are in turn connected across the pair of amplifier inputs 16, 18. This provides the bias necessary to the read amplifier 28 for its proper operation. In a preferred embodiment, the buffer 20 is a unity gain push-pull amplifier.

When $R_{MR}$ is initially selected to perform a read operation, meaning current from the DC bias current source 24 and DC bias current sink 26 begins to flow through $R_{MR}$, the coupling capacitors C1 and C2 are typically not charged to their equilibrium value. The voltage node $V_B$ provides the potential through the bias resistors R1 and R2 to charge the coupling capacitors C1 and C2 respectively. The time period to charge the coupling capacitors C1 and C2 is a function of their settling time constants which are (assuming the input impedance of the read amplifier 28 is infinity) equal to the product of their capacitarnce and the resistance of their respective bias resistors R1 or R2.

In order to decrease the time associated with charging the coupling capacitors C1 and C2, the pair of shunting switches S3 and S4 are connected in parallel to the bias resistors R1 and R2, respectively. The shunting switches S3 and S4 selectively provide a low impedance path between $V_B$ and the coupling capacitors C1 and C2. Closing the shunting switches S3 and S4 significantly reduces the resistance associated with the settling time constants of the coupling capacitors C1 and C2 and thus significantly reduces their charging times. Closing the pair of shunting switches S3 and S4 during the charging period of the pair of coupling capacitors C1 and C2 effectively drives their potential to equilibration with the DC portion of the potential across $R_{MR}$, or to $V_B$ plus or minus one half of the DC portion of the potential across $R_{MR}$.

When equilibrated, the charge on C1 equals $V_B$ minus one half of the DC portion of the potential across $R_{MR}$ and the charge on C2 equals $V_B$ plus one half of the DC portion of the potential across $R_{MR}$. Therefore, by driving the charge on the pair of coupling capacitors C1 and C2 to equilibration with the DC portion of the potential across $R_{MR}$, the time delay associated with equilibrating the pair of coupling capacitors C1 and C2 is decreased.

The decrease in the time delay is equal to the difference between the time to charge the coupling capacitor C2 to $V_B$ plus one half of the DC portion of the potential across $R_{MR}$ through the bias resistor R2 as compared with through the shunting switch S4 in a closed position. Because the time to charge the coupling capacitor C2 to $V_B$ plus one half of the DC portion of the potential across $R_{MR}$ through the shunting switch S4 is virtually zero, the decrease in the time delay is approximately equal to the time it takes to charge the coupling capacitor C2 to equilibration through the bias resistor R2.

Control of the pair of shunting switches S3 and S4 is provided by the control circuit 22 which is communicably connected to the pair of shunting switches S3 and S4. Once the coupling capacitors C1 and C2 are charged to equilibration with the DC portion of the potential across $R_{MR}$, or $V_B$ plus or minus one half of the DC portion of the potential across $R_{MR}$, the pair of shunting switches S3 and S4 are opened. This allows the AC portion of the potential to be received by the read amplifier 28 enabling the proper operation of the system.

Additionally, by closing the pair of shunting switches S3 and S4, the pair of amplifier inputs 16, 18 are shorted to the voltage node $V_B$. This prevents the propagation of any transient signals or noise through the preamplifier bias circuit 10 to the read amplifier 28. Transient signals or other disturbances generally occur in conjunction with a modal change, as a result of a thermal asperity or during a write operation. A modal change occurs when the disk drive transitions from a write mode to a read mode or when the DC current source 24 and DC current sink 26 are coupled to a different MR element $R_{MR}$ in a multiple MR element system. By closing the shunting switches S3 and S4, the read amplifier 28 is protected from saturation or damage by any transient signals or noise. This further decreases the delay time before the system is operational by avoiding any recovery time associated with the read amplifier 28 being saturated.

In a preferred embodiment, the pair of shunting switches S3 and S4 work in conjunction with the pair of shorting switches S1 and S2. The pair of shorting switches S1 and S2 are connected across $R_{MR}$ with the voltage node $V_C$ connected between the pair of shorting switches S1 and S2. The voltage node $V_C$ is preferably connected to ground so that when the pair of shorting switches S1 and S2 are closed, $R_{MR}$ is shorted to ground preventing current flow through $R_{MR}$.

The shorting switches S1 and S2 are closed when $R_{MR}$ is not selected to perform a read operation. This protects $R_{MR}$ and the read amplifier 28. $R_{MR}$ is protected by holding the potential across $R_{MR}$ at $V_C$, or ground, which is also generally the potential of the disk media. By avoiding a large potential difference between $R_{MR}$ and the disk media, arcing between the two can be averted which could otherwise damage either $R_{MR}$ or the disk media. Shorting $R_{MR}$ to ground by closing the pair of shorting switches S1 and S2 also prevents transient signals or noise from propagating across $R_{MR}$ and causing damage to the system. With the pair of shorting switches S1 and S2 closed, the pair of coupling capacitors C1 and C2 are changed to $V_B$ and are near their equilibration point.

The pair of shorting switches S1 and S2 are also communicably connected to and controlled by the control circuit 22. In a preferred embodiment which incorporates the switches S1–S4, the control circuit 22 only opens the pair of shorting switches S1 and S2 when $R_{MR}$ is selected to perform a read operation. When $R_{MR}$ is not selected, the control circuit closes the pair of shorting switches S1 and S2 and opens the pair of shunting switches S3 and S4 which charges the coupling capacitors C1 and C2 to $V_B$. Once $R_{MR}$ is selected, the control circuit 22 opens the pair of shorting switches S1 and S2 and closes the pair of shunting switches S3 and S4 to drive the pair of coupling capacitors C1 and C2 to equilibration with the DC portion of the potential across $R_{MR}$.

In a preferred embodiment, the pair of shorting switches S1 and S2 and the pair of shunting switches S3 and S4, are metal-oxide-semi-conductor (MOS) switches for use with the read amplifier 28 which is also a MOS type amplifier. The control circuit 22 is communicably connected to the switches S1–S4 through their respective gates to control their operation and either close the switches allowing current to flow through their respective sources and drains or open the switches preventing current flow through their respective sources and drains.

Figure 2:
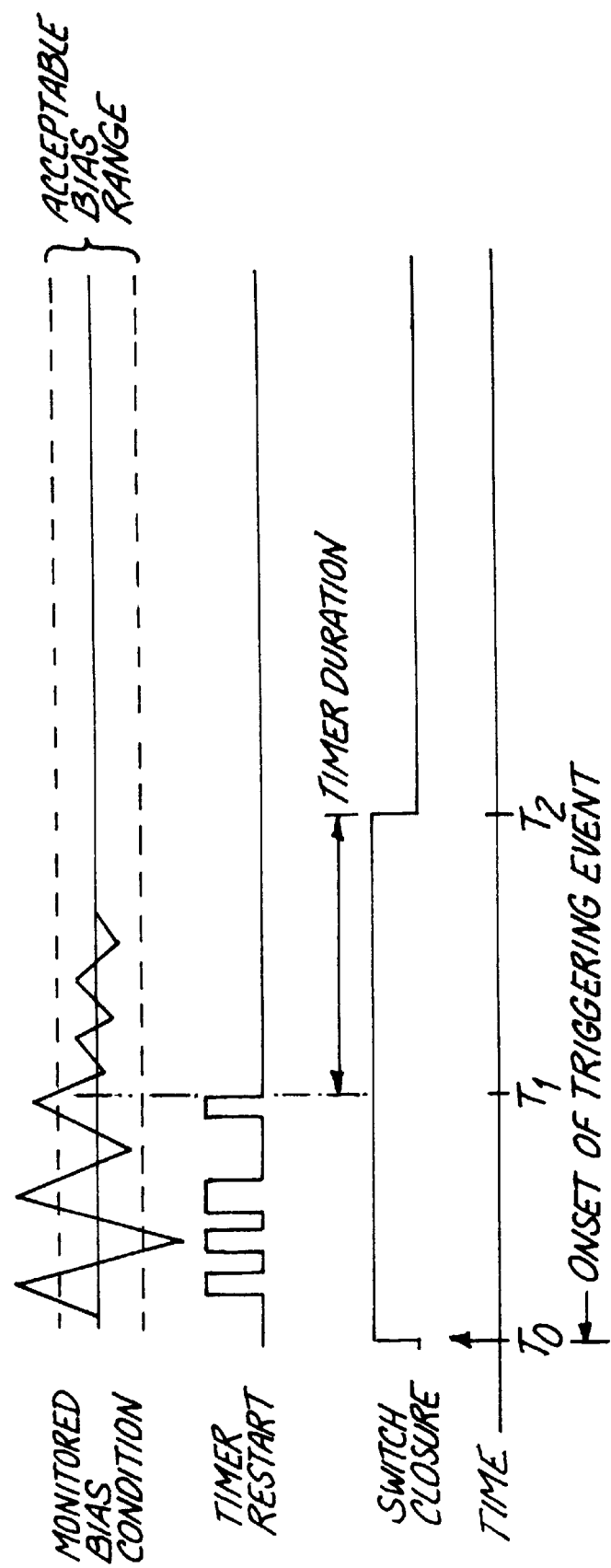
FIG. 2 is a timing diagram of the operation of a preamplifier bias circuit in a preferred embodiment.

In a preferred embodiment, the control circuit 22 which controls the operation of switches S1–S4 is a retriggerable timer that monitors either the bias across or current flow through $R_{MR}$, or the bias across one of the coupling capacitors C1 or C2. As shown in FIG. 2, whenever a triggering event occurs, such as at time $T_0$, the retriggerable timer begins to monitor the desired component and the control circuit 22 opens the shorting switches S1 and S2 and closes the shunting switches S3 and S4. The control circuit 22 maintains the shorting switches S1 and S2 open for the duration of the read operation by $R_{MR}$. The triggering event could be either the selection of $R_{MR}$ to perform a read operation or the detection of a transient signal or noise.

Once the triggering event occurs at $T_0$, the retriggerable timer begins to monitor the desired component to ensure its value is within an established acceptable range. Whenever the value of the monitored component falls outside of that range, the retriggerable timer restarts a time delay of an established duration. As shown in FIG. 2, the time delay is restarted on four separate occasions during the time period $T_0$–$T_1$.

During the duration of the time delay, the control circuit 22 maintains the pair of shunting switches S3 and S4 in a closed position. Once the established duration of the time delay expires without the monitored condition falling outside of the acceptable range, the control circuit 22 opens the pair of shunting switches S3 and S4. The established duration of the time delay is shown in FIG. 2 as the time period from $T_1$ to $T_2$ with the control circuit 22 opening the shunting switches S3 and S4 at time $T_2$. Once the shunting switches S3 and S4 are opened, the coupling capacitor C1 and C2 are equilibrated and the system will begin to operate properly. The control circuit 22 could also be a fixed timer set to a sufficient period of time to ensure that the signal across $R_{MR}$ is within an acceptable range, and the coupling capacitors C1 and C2 are equilibrated before the shunting switches S3 and S4 are opened.

Figure 3:
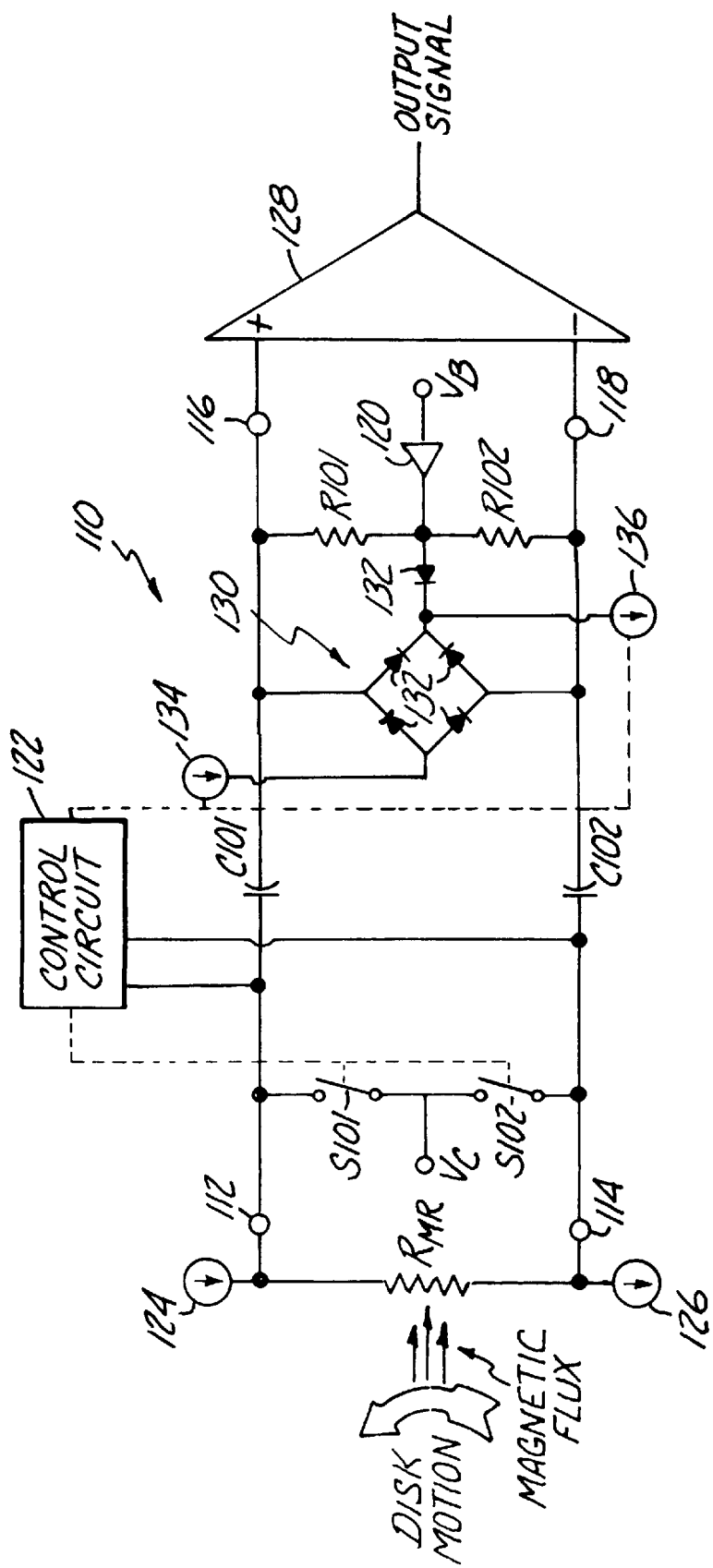
FIG. 3 is a schematic diagram of a preamplifier bias circuit in a second preferred embodiment.

In FIG. 3, a second preferred embodiment of the preamplifier bias circuit 110 is shown. This preferred embodiment of the invention is preferably used when a read amplifier 128 is a bipolar type of amplifier. In FIG. 3, elements that are identical and function similarly to elements contained in FIG. 1 are designated with similar reference numerals but are separated by a difference of "100". For example, the pair of head contacts 12, 14 in FIG. 1 are identical and function similarly to a pair of head contacts 112, 114 in FIG. 3.

The preamplifier bias circuit 110 includes in addition to the pair of head contacts 112, 114, a pair of shorting switches S101 and S102, a pair of coupling capacitors C101 and C102, a diode bridge 130, a pair of bias resistors R101 and R102, a pair of amplifier inputs 116, 118, a pair of voltage nodes $V_B$ and $V_C$, a buffer 120 and a control circuit 122.

The pair of head contacts 112, 114 connect the preamplifier bias circuit 110 to a magnetoresistive element $R_{MR}$. The resistance of $R_{MR}$ alters in accordance with changes in the magnetic flux contained on a disc as it passes $R_{MR}$. Current flows through $R_{MR}$ from a DC bias current source 124 and a DC bias current sink 126 which converts the alterations in resistance to changes in potential across $R_{MR}$. The changes in potential across $R_{MR}$ are propagated through the preamplifier bias circuit 110 to a read amplifier 128 connected to the pair of amplifier inputs 116, 118. The read amplifier 128 then generates an output signal from the changes in potential that can be detected to identify the information on the disc.

In order to bias the read amplifier 128 in a preferred embodiment, the voltage node $V_B$ is connected through the buffer 120 between the pair of bias resistor R101 and R102 which are in turn connected between the pair of amplifier inputs 116, 118. In a preferred embodiment, the buffer 120 is a unity gain push-pull amplifier.

The potential across $R_{MR}$ contains a static or DC potential as well as the changing or AC potential. However, providing the DC portion of the potential across $R_{MR}$ to the read amplifier 128 frustrates the operation of the read amplifier 128 creating an inaccurate output signal.

To block or prevent the DC portion of the potential across $R_{MR}$ from being propagated through the preamplifier bias circuit 110, the coupling capacitors C101 and C102 are connected between the head contact 112 and the amplifier input 116 and between the head contact 114 and the amplifier input 118, respectively. The coupling capacitors C101 and C102 do not block the DC portion of the potential across $R_{MR}$ until they are equilibrated with the DC portion of the potential. To reach equilibration, the charge on the coupling capacitor C101 must equal $V_B$ less one half of the DC portion of the potential across $R_{MR}$, and the charge on the coupling capacitor C102 must equal $V_B$ plus one half of the DC portion of the potential across $R_{MR}$.

The time period to equilibrate the coupling capacitors C101 and C102 represents a time delay to the system once $R_{MR}$ is selected to perform a read operation. The time period associated with charging the coupling capacitors C101 and C102 is a function of their settling time constant which equals the product of their capacitance and the associated resistance. The settling time constants for the coupling capacitors C101 and C102 equals their individual capacitance multiplied by the input impedance of the bipolar read amplifier 128 divided by two.

To decrease the time delay associated with equilibrating the coupling capacitors C101 and C102, the diode bridge 130 is connected in parallel to the bias resistors R101 and R102 to selectively provide a low impedance path between $V_B$ and the coupling capacitors C101 and C102. The diode bridge 130 includes a series of diodes 132, a DC bridge current source 134 and a DC bridge current sink 136. The series of diodes 132 are connected such that when the DC bridge current source 134 and the DC bridge current sink 136 are turned on, the potential at the pair of amplifier inputs 116, 118 is shunted to $V_B$. This also drives the charge of the coupling capacitors C101 and C102 to their equilibration point, or $V_B$ minus and plus one half of the DC portion of the potential across $R_{MR}$, respectively. The resistance of the diode bridge 130 is significantly less than the bias resistors R101 and R102 thereby significantly reducing the settling time constant of the coupling capacitors C101 and C102. Hence, it also significantly reduces the time delay associated with charging the coupling capacitors C101 and C102 to their equilibration point.

Operation of the diode bridge 130 is controlled by the control circuit 122. The control circuit 122 is communicably connected to and controls the operation of the diode bridge 130 through the DC bridge current source 134 and the DC bridge current sink 136. To turn on the diode bridge 130, the control circuit 122 turns on the DC bridge current source 134 and the DC bridge current sink 136 generating current flow through the series of diodes 132.

Turning on the diode bridge 130 and shunting the voltage at the pair of amplifier inputs 116, 118 to $V_B$ also protects the read amplifier 128 from transient signals or noise that could be propagated through the preamplifier bias circuit 110. By turning on the diode bridge 130, transient signals or noise would pass through the diode bridge 130 and back out without saturating or damaging the read amplifier 128.

In a preferred embodiment, the preamplifier bias circuit 110 includes the pair of shorting switches S101 and S102 with the voltage node $V_C$ which work in conjunction with the diode bridge 130. The pair of shorting switches S101 and S102 are connected across the pair of head contacts 112, 114, with $V_C$ connected between the shorting switches S101 and S102. In a preferred embodiment, $V_C$ is connected to ground. Thus, by closing the shorting switches S101 and S102, $R_{MR}$ is shorted to $V_C$, or ground, preventing current flow through $R_{MR}$. The shorting switches S101 and S102 are preferably closed when $R_{MR}$ is not selected to perform a read operation. This protects not only $R_{MR}$, but also the preamplifier bias circuit 110 and the read amplifier 128 from transient signals, noise, or arcing between the disk media and $R_{MR}$. The control circuit 122 is communicably connected to and controls the operation of the shorting switches S101 and S102.

The control circuit 122, in a preferred embodiment, includes a retriggerable timer to control the length of time the diode bridge 130 is on once $R_{MR}$ is selected. The retriggerable timer monitors the bias across or current flow through $R_{MR}$, or the bias across one of the coupling capacitors C101 or C102. Upon the occurrence of a triggering event, such as the selection of $R_{MR}$ to perform a read operation or the detection of a transient signal or noise, the retriggerable timer begins the expiration of an established time period and the control circuit 122 opens the shorting switches S101 and S102 and turns on the diode bridge 130. The control circuit 122 maintains the shorting switches S101 and S102 in an open position for the duration of the read operation by $R_{MR}$.

As shown in FIG. 2, during the expiration of the established time period, if the control circuit 122 detects a signal outside of the acceptable range for the monitored signal it reinitiates the expiration of the established time period. This occurs in FIG. 2 during the time period $T_0$–$T_1$. Once the time period completely expires, the control circuit turns the diode bridge 130 off and the system begins to operate as the coupling capacitors C101 and C102 are already equilibrated. This occurs in FIG. 2 at time $T_2$.

In a preferred embodiment, which includes both the pair of shorting switches S101 and S102 and the diode bridge 130, when $R_{MR}$ is not selected the control circuit closes the pair of shorting switches S101 and S102 and turns off the diode bridge 130 which charges the coupling capacitors C101 and C102 to $V_B$. Once $R_{MR}$ is selected, the control circuit 122 opens the pair of shorting switches S101 and S102 and turns on the diode bridge 130 to drive the pair of coupling capacitors C101 and C102 to equilibration with the DC portion of the potential across $R_{MR}$.

Although the present invention has been described with reference to preferred embodiments, workers skilled in the art will recognize that changes may be made in form and detail without departing from the spirit and scope of the invention. For example, the preamplifier bias circuit could be used in a single or multiple magnetoresistive element system. In a multiple magnetoresistive element system one preamplifier bias circuit would preferably be coupled to each of the multiple magnetoresistive elements. However, a single preamplifier bias circuit could also be coupled between the multiple magnetoresistive elements as well. The preamplifier bias circuit would simply be coupled to the magnetoresistive element selected to perform a read operation. Additionally, the control circuit could comprise of a simple timer set to a pre-established time rather than use of the retriggerable timer to establish the length of time the shunting switches are closed.

By use of the preamplifier bias circuit, an AC coupled magnetoresistive read head amplifier can be protected from transient signals and can begin to read data from a disk faster.

What is claimed is:

1. A preamplifier bias circuit for use in an AC coupled magnetoresistive read head amplifier for reading a disk media, the preamplifier bias circuit comprising:

a pair of head contacts for connecting the preamplifier bias circuit to a magnetoresistive element of the AC coupled magnetoresistive read head amplifier;

a pair of amplifier inputs for connecting the preamplifier bias circuit to a read amplifier of the AC coupled magnetoresistive read head amplifier;

a pair of coupling capacitors connected between the pair of head contacts and the pair of amplifier inputs; and means for selectively shunting the amplifier inputs to rapidly charge the coupling capacitors and to protect the read amplifier, the magnetoresistive element and the disk media.

2. The preamplifier bias circuit of claim 1, wherein the means for selectively shunting the amplifier inputs includes a controllable shunting circuit to provide a low impedance path to the coupling capacitors and the amplifier inputs in response to a control signal, and a control circuit which generates the control signal as a function of the circuit conditions at the head contacts.

3. The preamplifier bias circuit of claim 2, and further comprising a pair of bias resistors connected between the pair of amplifier inputs and having a constant voltage node connected therebetween, and wherein the controllable shunting circuit is a pair of shunting switches connected in parallel to the pair of bias resistors and are communicably connected to and controlled by the control circuit.

4. The preamplifier bias circuit of claim 2, and further comprising a pair of bias resistors which are connected between the amplifier inputs, and a constant voltage node connected between the pair of bias resistors, and wherein the controllable shunting circuit comprises a diode bridge having a DC bridge current source, a DC bridge current sink, and diodes connected in parallel to the pair of bias resistors, such that when the control circuit, which is communicably connected to the DC bridge current source and the DC bridge current sink, generates the control signal to turn on the DC bridge current source and the DC bridge current sink, current flows through the diodes and shunts the potential at the pair of coupling capacitors and the pair of amplifier inputs to a potential of the constant voltage node.

5. The preamplifier bias circuit of claim 2, wherein the control circuit includes a retriggerable timer that when enabled monitors the condition of the preamplifier bias circuit to determine a period of time the controllable shunting circuit provides a low impedance path to the coupling capacitors and the amplifier inputs.

6. The preamplifier bias circuit of claim 5, wherein the retriggerable timer monitors a bias condition across the pair of head contacts.

7. The preamplifier bias circuit of claim 5, wherein the retriggerable timer monitors a current through the magnetoresistive element connected between the pair of head contacts.

8. The preamplifier bias circuit of claim 5, wherein the retriggerable timer monitors a bias condition across one of the pair of coupling capacitors.

9. The preamplifier bias circuit of claim 2, wherein the control circuit includes a fixed timer to determine a period of time the controllable shunting circuit provides a low impedance path to the coupling capacitors and the amplifier inputs.

10. The preamplifier bias circuit of claim 1 including means for selectively shorting the head contacts in response to a shorting control signal, and a control circuit for generating the shorting control signal as a function of the selection for operation of the magnetoresistive element.

11. The preamplifier bias circuit of claim 10, wherein the means for selectively shorting the head contacts comprises a pair of shorting switches which are connected between the pair of head contacts and are communicably connected to and are controlled by the control circuit, and a constant voltage node connected between the pair of shorting switches.

12. The preamplifier bias circuit of claim 11, wherein the shorting switches are MOS switches.

13. A preamplifier bias circuit for use in an AC coupled magnetoresistive read head amplifier, the preamplifier bias circuit comprising:
   a pair of head contacts for connecting the preamplifier bias circuit to a magnetoresistive element of the AC coupled magnetoresistive read head amplifier;
   a pair of amplifier inputs for connecting the preamplifier bias circuit to a read amplifier of the AC coupled magnetoresistive read head amplifier;
   a pair of coupling capacitors, wherein one of the coupling capacitors is connected between one of the head contacts and one of the amplifier inputs and the other coupling capacitor is connected between the other head contact and the other amplifier input such that the pair of coupling capacitors equilibrate with a static potential across the magnetoresistive element;
   a controllable charging circuit for charging the coupling capacitors through a low impedance path in response to a first control signal; and
   a control circuit which generates the first control signal as a function of the circuit conditions of the head contacts.

14. The preamplifier bias circuit of claim 13, and further comprising a pair of bias resistors connected between the amplifier inputs and a constant voltage node connected between the bias resistors, and wherein the controllable charging circuit comprises a pair of shunting switches communicably connected to and controlled by the control circuit and which are connected in parallel to the pair of bias resistors.

15. The preamplifier bias circuit of claim 13 and further comprising a pair of bias resistors having a constant voltage node connected therebetween and which are in turn connected between the amplifier inputs, and wherein the controllable charging circuit comprises a diode bridge having a DC bridge current source, a DC bridge current sink, and diodes which are connected in parallel to the pair of bias resistors, the DC bridge current source and the DC bridge current sink being communicably connected to and controlled by the control circuit so that when they are turned on current flows through the diodes and shunts the potential at the pair of coupling capacitors and the pair of amplifier inputs to the potential of the constant voltage node.

16. The preamplifier bias circuit of claim 13, wherein the control circuit includes a retriggerable timer that when enabled monitors the condition of the preamplifier bias circuit to determine a period of time the controllable charging circuit provides a low impedance path to the coupling capacitors and the pair of amplifier inputs.

17. The preamplifier bias circuit of claim 16, wherein the retriggerable timer monitors a bias condition across the pair of head contacts.

18. The preamplifier bias circuit of claim 16, wherein the retriggerable timer monitors a current through the magnetoresistive element connected between the pair of head contacts.

19. The preamplifier bias circuit of claim 16, wherein the retriggerable timer monitors a bias condition across one of the pair of coupling capacitors.

20. The preamplifier bias circuit of claim 13, wherein the control circuit includes a fixed timer to determine a period of time the controllable charging circuit provides a low impedance path to the coupling capacitors and the amplifier inputs.

21. The preamplifier bias circuit of claim 13 including means for selectively shorting the head contacts in response to a second control signal generated by the control circuit as a function of selection for operation of the magnetoresistive element.

22. The preamplifier bias circuit of claim 21, wherein the means for selectively shorting the head contacts comprises a pair of shorting switches which are connected between the pair of head contacts and are communicably connected to and controlled by the control circuit, and a constant voltage node connected between the pair of shorting switches.

23. The preamplifier bias circuit of claim 22, wherein the switches are MOS switches.

24. A preamplifier bias circuit for use in an AC coupled magnetoresistive read head amplifier, the preamplifier bias circuit comprising:
   a first and a second head contact;
   a first and a second amplifier input;
   a control circuit for generating control signals;
   a first coupling capacitor connected between the first head contact and the first amplifier input; and
   first means for providing a low impedance charging path to the first coupling capacitor in response to a first control signal received from the control circuit.

25. The preamplifier bias circuit of claim 24 including:
   a first constant voltage node having a predetermined voltage; and
   a first bias resistor connected between the first amplifier input and the first constant voltage node.

26. The preamplifier bias circuit of claim 25, wherein the potential of the first constant voltage node is provided through a buffer configured as a unity gain push-pull amplifier.

27. The preamplifier bias circuit of claim 25, wherein the first means for providing a low impedance charging path to the first coupling capacitor comprises a first shunting switch that is connected in parallel to the first bias resistor and is communicably connected to and controlled by the control circuit.

28. The preamplifier bias circuit of claim 27 and further comprising a second bias resistor connected between the first constant voltage node and the second amplifier input including:

a second coupling capacitor connected between the second head contact and the second amplifier input; and second means for providing a low impedance charging path to the second coupling capacitor in response to the first control signal received from the control circuit.

29. The preamplifier bias circuit of claim 28, wherein the second means for providing a low impedance charging path to the second coupling capacitor comprises a second shunting switch that is connected in parallel to the second bias resistor and is communicably connected to and controlled by the control circuit.

30. The preamplifier bias circuit of claim 28, wherein the first and the second means for providing a low impedance path to the first and the second coupling capacitors, respectively, comprises a diode bridge having a DC bridge current source and a DC bridge current sink which are communicably connected to the control circuit to generate a current flow through diodes connected in parallel to the first and the second bias resistors in response to the first control signal of the control circuit to shunt the potential at the coupling capacitors and the amplifier inputs to the potential of the first constant voltage node.

31. The preamplifier bias circuit of claim 28, wherein the control circuit includes a retriggerable timer that when enabled monitors the condition of the preamplifier bias circuit to determine a period of time the first and the second means for providing a low impedance path provides a low impedance path to the first and the second coupling capacitors.

32. The preamplifier bias circuit of claim 31, wherein the retriggerable timer monitors a bias condition across the pair of head contacts.

33. The preamplifier bias circuit of claim 31, wherein the retriggerable timer monitors current through a magnetoresistive element connected between the pair of head contacts.

34. The preamplifier bias circuit of claim 31, wherein the retriggerable timer monitors a bias condition across one of the coupling capacitors.

35. The preamplifier bias circuit of claim 28, wherein the control circuit includes a fixed timer to determine a period of time the first and the second means for providing a low impedance path to the coupling capacitors and the amplifier inputs.

36. The preamplifier bias circuit of claim 24 including means to selectively short the head contacts.

37. The preamplifier bias circuit of claim 36, wherein the means to selectively short the head contacts comprises:

a first and a second shorting switch connected between the first head contact and the second head contact that are communicably connected to and controlled by the control circuit in response to a second control signal generated as a result of the selection for operation of a magnetoresistive element connected between the first and the second head contacts; and a second constant voltage node having a predetermined voltage connected between the first and the second shorting switches.

38. The preamplifier bias circuit of claim 37, wherein the first and the second shorting switches are MOS switches.

39. The preamplifier bias circuit of claim 37, wherein the second constant voltage node is connected to ground.

\* \* \* \* \*